(No Model.)
M. NEIL.
MODE OF AND APPLIANCE FOR PLASHING HEDGES.
No. 518,466. Patented Apr. 17, 1894.
Fig. 1
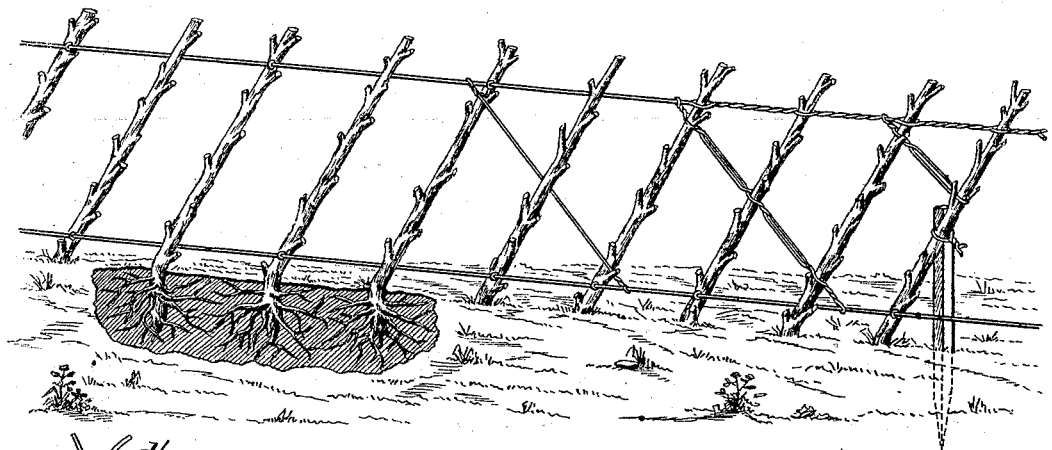
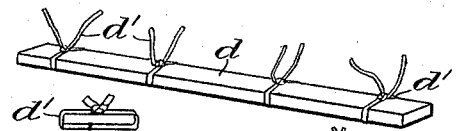
Fig. 3
Fig. 5
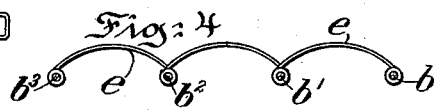
Fig. 4
Fig. 2
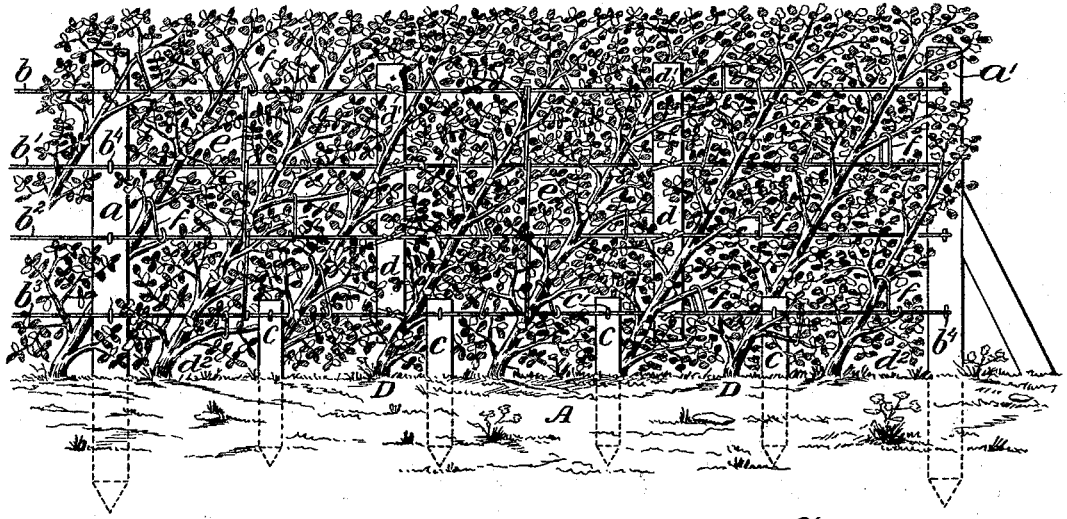
Witnesses:
Thomas M. Smith.
W. A. Schaefer.
Inventor.
Michael Neil,
By J. Walter Douglass.
Attorney.
THE NATIONAL LITHOGRAPHING COMPANY,
WASHINGTON, D. C.

UNITED STATES PATENT OFFICE.

MICHAEL NEIL, OF DAYTON, OHIO, ASSIGNOR OF TWO-THIRDS TO MARTHA J. NEIL, OF SAME PLACE.

MODE OF AND APPLIANCE FOR PLASHING HEDGES.

SPECIFICATION forming part of Letters Patent No. 518,466, dated April 17, 1894.

Application filed October 7, 1893. Serial No. 487,429. (No model.)

*To all whom it may concern:*

Be it known that I, MICHAEL NEIL, a citizen of the United States, residing at Dayton, in the county of Montgomery and State of Ohio, have invented certain new and useful Improvements in Appliances for Plashing Hedges, of which the following is a specification.

My invention relates in general to that class of hedge-fences in which the plants or canes are bent downward in the direction of the plane of the fence; and it relates more particularly to appliances for plashing such live hedge-fences.

Hitherto in the plashing of hedges, one mode was to bend the top or upper ends of the growing twigs or hedge canes in the plane of the fence and to secure them permanently in that position by fastenings applied to the same at or near the upper ends of the twigs, branches or canes. Among the different modes of applying such fastenings may be mentioned first, the interweaving or intertwining of the extreme upper ends of the twigs to or among themselves; second, the interweaving with the extreme upper ends of the twigs, rods or twigs arranged in a horizontal position; and third, the bending of the extreme upper ends of the twigs to the ground and securing them thereto by means of weights. In some instances in the practice of the last mentioned mode of fastening down the ends of the twigs, they were notched or cut near the ground on the same side with the weights, in order to insure more readily the bending thereof, but the main objection and difficulty to such mode of plashing the hedge, was in the bending and fastening of them at or near their tops, of the bodies of the twigs being caused to assume curved or bowed shapes, with frequently wide open spaces between them and entirely unsupported and disconnected near the ground, which afforded small animals easy access therethrough, and as a consequence disarrangement of the hedge, as well as the destruction of the twigs or shoots thereof. Moreover, the work of plashing could not be done with any degree of uniformity, nor so as to give the hedge a close and tight base while any considerable portions of the lower parts of the twigs or canes remained in upright positions, and the fastenings thus formed were not sufficiently substantial or durable for the reason that the tops of the canes, as well as the branches, soon decayed from various causes, and especially through such modes of fastening of the canes or plants. When the ends of the twigs were bent downward and in the direction of the ground and fastened by weights the further difficulty arose of the sap being compelled thereby to flow from the upper portion of the bent twigs downward to reach the extreme end and as such downward movement was unnatural, the sap was forced into the shoots or sprouts nearest to the base of the plant and thus the downwardly inclined ends would wither and decay. The other mode of plashing the twigs or canes tended to throw out extra strong shoots below, at which the hacking or cutting was done, thus eventually absorbing the whole of the sap and causing all that part of the canes bent downward to ultimately die or decay, so that hedges in such manner plashed not only lacked uniformity of structure, but grew unevenly, became ragged in appearance in a short time, and were consequently subject to accidental as well as other injury, due especially to the hacking and the mode of fastening and generally to the displacement of the twigs or canes in the manner hereinbefore stated.

Another mode of plashing hedges was to incline the twigs or canes so as to be held nearly straight and parallel to each other and to apply strong fastenings near the bottom of the hedge to the respective twigs in order that the same might be fastened near the ground to the higher part of the overlapping twig or twigs, so that the upward strain of the fastenings upon the twigs would come at a point as near as possible to the bend or angle of the cane, while the downward strain holding them in position should come at a point farther from the bend, but so as to leave the body and upper end of each of the twigs free and unbent, although inclined upward in such position, they were supposed to grow and send out shoots in regular sequence, but such was not the case in practice, but on the other hand the plants or canes plashed in such manner lacked in the permitted growth that firmness, stability or solidity and characteristic beauty essentially requisite in such a live hedge-fence.

Another more recent and generally practiced mode of plashing fences, was to stretch a line of wire across openings caused by the injury or removal of some of the plants set out in the line of the proposed fence and to secure the same to the plants, twigs or canes. The wires being secured to position in connection with the plants, twigs or canes at the time when the plashing was done, because at that time there were no side branches to prevent it being readily and quickly done.

In the construction of live hedge-fences it is now the common practice to train up or cultivate the hedge-plants in nurseries until they are between one and two years old. Then the plants are assorted and transplanted so as to set those of nearly uniform size together in prepared ground therefor, in the line of the proposed live hedge-fence. Then they are usually cultivated or cared for until they arrive at a sufficient size for plashing. The plants or canes being divested of their branches, twigs or shoots, the plashing is proceeded with, by first bending the plants or canes downward in the direction of the plane of the fence and securing them in such position. In some instances the plants or canes are bent in at their roots, so that the stalks shall occupy a comparatively straight position above the surface of the ground and then inclined at the required angle to the perpendicular. In practice it very frequently happens that through lack of that care which should be exercised, the plants or canes become stunted, broken down, killed or die out in a short time and their injury or removal from the hedge row leaves spaces or openings which render it impossible, when plashing the plants or canes to make a regular or continuous fence. In other instances the plashing is done by driving a stake in a proper position with reference to the first plant or cane in the row and then bending down the plant or cane. The bending taking place at or about the root of the plant and the securing of it, to the stake with a wire or similar fastening. A piece of wire is then taken and passed under the base of the first plant quite near to the ground, bringing the ends upon either side and then bending down the next plant or cane and twisting the wire over it and so on in like manner with each succeeding plant until there is secured as many plants as the wire is capable of holding in proper relative positions and when this is done there is twisted together the extremities of the wire. The wire running approximately at right angles to the plants in their downwardly bent position. When the first section of wire is exhausted, another wire is passed around the base of the last plant or cane or some preceding plant or cane previously caused to assume a bent down position and secured in the manner stated, until all the plants or canes from the upper portion of the roots of which the soil has been removed or one or more lines of the wire may be stretched first, and then the plants bent down and secured to position by attaching them to the wire. When they have been caused to assume such position as last mentioned, the soil is replaced around the exposed portions of the roots, thus leaving the bodies of the plants above ground nearly straight and parallel to each other, yet of course inclined in the direction of the plane of the fence. When the fence is first plashed and before the side shoots have sufficiently grown out and become interlocked, the fence has not that degree of lateral strength and compactness that is desirable. Moreover, it requires considerable time before there is sufficient growth of the side shoots to fill up and protect the spaces between the plants. It has been suggested to give the fence the requisite degree of lateral strength at the start by applying a continuous horizontal line or lines of wire along it from end to end and to secure the line or lines of wire directly to the plants by staples, nails or the like driven into the same, all of which modes of plashing live hedge-fences in practice have presented many serious objections.

The principal objects of my invention are first, to overcome many of the objectionable features attending upon and the disadvantageous features presented in the heretofore known and practiced modes of constructing or plashing live hedge-fences; second, to provide a hedge-fence which from the time plashed will present a strong or substantial structure, an impassable barrier to such stock as at times is permitted to run at large, to permit the healthy growth of the live hedge-fence from the time it is plashed, to avoid stunting, decay or sapping of the shoots, branches or twigs of the plants or canes and generally to allow the plants or canes to develop without damaging extraneous influences to interfere therewith and such as plashing heretofore occasioned, inasmuch, as such also rather tended to retard than stimulate a healthy growth of a beautiful live hedge-fence; third, to provide means for effecting the plashing of the fence by the inclining of the plants or canes in the direction of the plane thereof and without divesting the plants of their branches, twigs or shoots, except perhaps a few of the tops of the larger canes; and fourth, to provide simple, durable and effective means for plashing plants to constitute a live hedge-fence without applying directly to the same any means that would tend to sap, stunt or cause decay of any members, shoots or twigs of the plants or canes and to keep the same maintained in contact with the downward inclined plants in such manner as to allow of the growth with uniformity so as to constitute thereby a substantial and beautiful live hedge-fence.

My invention consists in a live hedge-fence cultivated and plashed so as to assume an inclined position and so as to afford a natural growth or development of the members or branches thereof without the employment of fastening means applied directly thereto in substantially the manner hereinafter described and claimed.

The nature and particular features of my invention will be more fully understood from the following description taken in connection with the accompanying drawings forming part hereof, and in which—

Figure 1, is a perspective view of a plashed live hedge-fence in one of the forms now practiced, showing the manner of plashing the same after removing the shoots, branches and twigs and the ground around and about the roots and plashing the same by inclining the plants, canes or bushes divested of their branches, twigs or shoots and then interweaving or intertwining longitudinal wires therewith and applying staples, nails or the like directly thereto. Fig. 2, is a similar view of an inclined live hedge-fence showing the same plashed according to my invention, and also showing the preferred means employed in the plashing operation. Fig. 3, is a perspective view of one of the vertical wooden or like distance stays with the wire loops or fastening devices thereof and with one of the same shown detached from the stay in order to illustrate the detail construction and arrangement thereof. Fig. 4, is a vertical transverse sectional view of one of the wire intertwining stays of the longitudinal wires, stringers or supports, showing the manner in which they engage the same in order to support to position the canes, branches or plants, as illustrated in Fig. 2; and Fig. 5, is a side elevational view in detail of clips for engaging or embracing the twigs, shoots or branches of the plants and also the longitudinal wires, supports or stringers, of Fig. 2.

Referring to the drawings $a$ and $a'$, represent posts planted and secured into the ground A.

$b$, $b'$, $b^2$ and $b^3$, represent a series of longitudinal wires, supports or stringers held taut and detachably secured to the vertical posts $a$ and $a'$, by means of staples $b^4$, or other somewhat similar attachments.

$c$, represents a series of stakes secured to position in the ground A, and connected with the bottom wire, stringer or support $b^3$, by means of staples $c'$, or other suitable fastenings.

$d$, are the vertical distance stays of wood or other suitable material and provided with fastening devices or wires $d'$, of any preferred form and adapted to engage and be twisted so as to hold portions of the plants or bushes in the proper inclined position adjacent to the series of wires, stringers or supports $b$, $b'$, $b^2$ and $b^3$. These distance stays $d$, are arranged out of line with the stakes $c$, engaging in the ground and the bottom longitudinal wire $b^3$, as clearly illustrated in Fig. 2.

$e$, represents a series of wire spanning stays intertwisted with the series of longitudinal wires, supports or stringers for not only maintaining the same respectively in parallel positions or straight courses, but also for embracing the bent or inclined branches of the plants, canes or bushes D.

$f$, represents two forms of clips adapted for employment in connection with the plashing of a live hedge-fence of my invention, and for engaging certain of the shoots, twigs or branches of the plants or canes with the longitudinal wires, stringers or supports $b$, $b'$, $b^2$ and $b^3$.

The plants or bushes are planted in the ground A, in any well understood and long practiced manner and they are plashed according to my invention by simply inclining or bending the same in the direction of the plane of the fence, after the several vertical posts $a$ and $a'$, have been secured in proper position in the ground and the series of longitudinal wire stringers or supports $b$, $b'$, $b^2$ and $b^3$, are suitably stapled thereto, for example, in the manner illustrated in Fig. 2, with all their twigs, shoots or branches or foliage undisturbed or intact from the ground upward and in the manner, for example, illustrated in Fig. 2, in contradistinction to the common practice in the past of divesting the canes or plants of all their foliage, shoots, twigs or branches before plashing as illustrated in Fig. 1, representing a familiar illustration of a mode of plashing live hedge-fences. When the plants or canes have been inclined by hand or otherwise, the clips $f$, in either of the forms clearly shown in Fig. 5, are applied to certain of the wires, stringers or supports $b$, $b'$, $b^2$ and $b^3$, and to the twigs, shoots or branches of the plants or canes D. The trunks or stalks of the plants or bushes are inclined so as to be embraced by the wire stays $e$, which extend from the bottom longitudinal wire to the top wire suitably intertwisted with each of them, for example, in the manner illuserated in Fig. 2, and embracing the stalks or trunks of the plants in such manner as to hold the same in the required inclined position without interfering with the natural growth or development of the plants or bushes around or about such connections with the same and the wires stringers or supports $b$, $b'$, $b^2$ and $b^3$, as illustrated in Figs. 2 and 4. The distance stays $d$, with their fastening means or wires $d'$, are then applied to the series of longitudinal wires or supports $b$, $b'$, $b^2$ and $b^3$, with the stalks or trunks of the plants interposed between them in position and the fastening wires are then twisted to the series of longitudinal wires or supports, thereby firmly holding without affecting or girdling the members of the plants or canes in any manner that might tend to stunt or retard the healthy natural growth or development thereof. The bending or inclining of the plants or bushes is continued until the entire hedge has been duly plashed and in substantially the manner illustrated in Fig. 2.

It will be observed that the undergrowth of the plants or bushes as designated by the letter $d^2$, is permitted to remain intact and thus by such permitted natural and healthy development of the plants or bushes soon to become a solid or thick mass of sprouts or shoots so interlacing and intertwining with each other as to be an absolute barrier to the entrance of small animals.

Having thus described the nature and objects of my invention, what I claim as new, and desire to secure by Letters Patent, is—

A plashed live hedge fence having the canes with their foliage inclined and so maintained by being through wire clips attached to a series of stringer wires secured to posts and engaged by wire intermediary stays which also engage the canes; and having a series of vertically supported wooden stays attached to the stringers and maintaining the plants between the stringers and stays, the lowest stringer being attached to short intermediate stakes that enter the ground, substantially as and for the purposes set forth.

In testimony whereof I have hereunto set my signature in the presence of two subscribing witnesses.

MICHAEL NEIL.

Witnesses:
W. H. NEIL,
H. H. PRUGH.